United States Patent
Delaney

(10) Patent No.: US 8,402,850 B2
(45) Date of Patent: *Mar. 26, 2013

(54) LOAD DISPLACEMENT APPARATUS

(75) Inventor: François Delaney, L'Assomption (CA)

(73) Assignee: Delaney Technologies Inc., L'Assomption, Quebec (CA)

( * ) Notice: Subject to any disclaimer, the term of this patent is extended or adjusted under 35 U.S.C. 154(b) by 568 days.

This patent is subject to a terminal disclaimer.

(21) Appl. No.: 12/654,051

(22) Filed: Dec. 9, 2009

(65) Prior Publication Data

US 2010/0089701 A1 Apr. 15, 2010

Related U.S. Application Data

(63) Continuation-in-part of application No. 11/252,054, filed on Oct. 18, 2005, now abandoned.

(60) Provisional application No. 60/619,869, filed on Oct. 19, 2004.

(51) Int. Cl.
*F16H 21/00* (2006.01)
*F16C 19/50* (2006.01)
*B66B 9/02* (2006.01)
*E04G 1/18* (2006.01)

(52) U.S. Cl. ............. 74/27; 384/451; 187/271; 182/141

(58) Field of Classification Search .................. 74/22 A, 74/25, 27, 89, 89.14, 89.2, 89.21; 384/43, 384/447, 451; 187/267, 268, 270, 271, 214; 254/92, 98, 102, 103, 134; 182/141

See application file for complete search history.

(56) References Cited

U.S. PATENT DOCUMENTS

| 3,467,447 | A | * | 9/1969 | Newman .......................... 384/45 |
| 4,541,297 | A | | 9/1985 | Fujita |
| 5,094,118 | A | | 3/1992 | Morita |
| H1384 | H | | 12/1994 | Sievert |
| 5,809,837 | A | | 9/1998 | Shaffer |
| 6,082,209 | A | | 7/2000 | Yabe et al. |
| 6,095,285 | A | | 8/2000 | St-Germain |
| 6,379,276 | B1 | | 4/2002 | Cheng |
| 6,481,305 | B2 | | 11/2002 | Nishimura et al. |
| 6,598,708 | B2 | | 7/2003 | St-Germain et al. |
| 6,755,283 | B2 | | 6/2004 | Lin |
| 6,869,220 | B2 | | 3/2005 | Yamaguchi et al. |
| 6,939,044 | B1 | * | 9/2005 | Lyon et al. ....................... 384/45 |
| 2004/0082431 | A1 | | 4/2004 | Maydew |
| 2004/0083840 | A1 | | 5/2004 | King et al. |
| 2004/0244520 | A1 | | 12/2004 | Cornelius et al. |
| 2005/0056492 | A1 | | 3/2005 | Nielsen |

* cited by examiner

*Primary Examiner* — James Pilkington

(74) *Attorney, Agent, or Firm* — Equinox IP; Franz Bonsang

(57) ABSTRACT

A load displacement apparatus to displace a mobile platform along a structure includes a worm screw mounted on the platform for rotation about its axis that meshes with a plurality of support blocks mounted on the structure. The support blocks are spaced apart from one another along the structure to be successively engaged by the worm screw. Each support block includes a plurality of bearing balls freely movably supported and retained therein to selectively and movably engage the worm screw over at least an arc segment thereof such that the worm screw is always in meshing engagement with at least one of the support blocks. A scaffolding system incorporating the apparatus is also described.

27 Claims, 12 Drawing Sheets

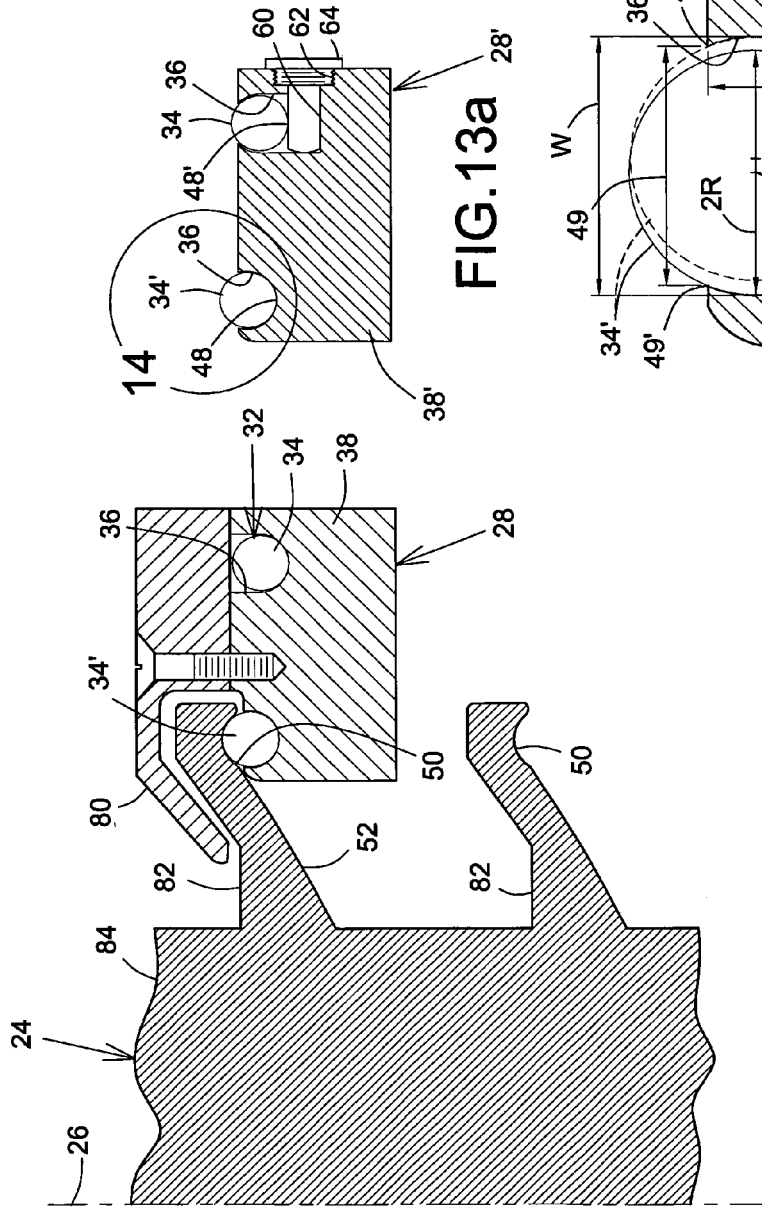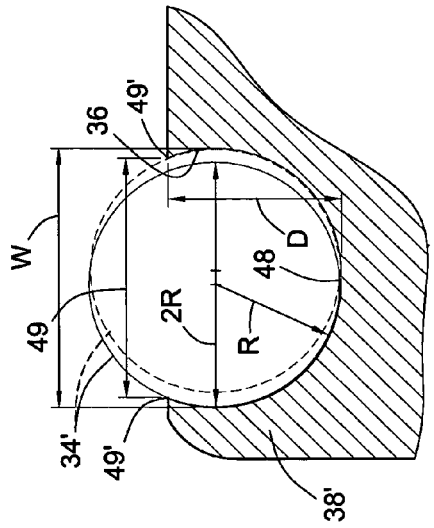

LOAD DISPLACEMENT APPARATUS

CROSS-REFERENCE TO RELATED APPLICATIONS

The present application is a continuation-in-part (C.I.P.) of application Ser. No. 11/252,054, filed on Oct. 18, 2005, now abandoned and which claimed benefit of U.S. Provisional Application for Patent Ser. No. 60/619,869, filed on Oct. 19, 2004, both of which are incorporated herein by reference.

FIELD OF THE INVENTION

The present invention relates to load displacement systems and is more particularly concerned with a load displacement apparatus and the components used in the displacement mechanism thereof for longitudinal displacement of a load along a structure as in scaffoldings or the like, there being vertical, inclined or horizontal.

BACKGROUND OF THE INVENTION

It is well known in the art to use different lifting mechanisms in scaffoldings. Known scaffolding systems, and other types of load displacement systems, include a work platform or the like that is displaceable along a tower or the like.

Some towers support a plurality of work platforms, each carrying its own lifting mechanism. Furthermore, when the uppermost work platform needs to go back down, all platforms underneath obviously need to go down first, which is relatively expensive and inefficient. Most of the lifting mechanisms offer relatively slow platform displacement speeds in the order of a few (about 2 to 5) feet per minutes (about 0.6 to 1.5 meters per minute) which is really time consuming when the platform needs to be raised at and lowered from a few hundred feet high. Furthermore, the lifting mechanisms usually need additional safety mechanisms to prevent any possible free fall of the platforms. Lifting mechanisms using rollers meshing with a worm screw are subject to surface wear at the contacting interface there between and are limited to their loading capacity by the roller shafts and their support bearings. Furthermore, they suffer drawbacks from the tedious alignment of the rollers required in assembly. Also, in the event of shaft rupture, the platform risks to simply fall down until a safety mechanism is activated, thereby providing a braking shock and possible injuries or other types of subsequent failures.

Load displacement mechanisms that use balls into conventional ball screw systems as load carriers are typically expensive to manufacture and in maintenance. Accordingly, the balls of the ball screw circulate inside a loop that circles around at least one complete turn (360°) of the screw thread in a cycle fashion; which is relatively complex in manufacturing.

Other bearing systems, as disclosed by Sievert in U.S. Statutory Invention Registration No. H1384 published on Dec. 6, 1994, has a continuous bearing with the load bearing balls undergoing extensive shear loads instead of compressive loads, which would not be acceptable in case of failure. Furthermore, the bearing of Sievert is made to work in reciprocating displacement with the bearing balls never circling along the entire ball receptacle loop, which would be prevented by the balls jamming therein (because of a tendency of a ball to start rolling over or under a preceding ball—zig-zag phenomenon), and with the exposed balls being prevented from falling off by a race of the outer bail (moving part). Additionally, each ball of Sievert's bearing would not be capable of sustaining on its own without any damage a charge weighing many tons as would be the case in most load displacement systems.

Accordingly, there is a need for an improved load displacement apparatus with a simple configuration and improved components used therefor.

SUMMARY OF THE INVENTION

It is therefore a general object of the present invention to provide an improved load displacement apparatus with a simple configuration and/or improved components used therefor.

The innovative features of the load displacement apparatus of the present invention allows for the apparatus to have different functions that enable the apparatus to be usable in a wide variety of applications. Amongst these features is the fact that the apparatus is what is called a 'fail-safe' apparatus to ensure that all users will never be endangered upon failure of the apparatus, and prevent any free fall or the like displacements. Also, the present apparatus can be used for vertical, inclined, and even horizontal displacements of charges with rectilinear or curved trajectories. In some embodiments, all components, including gear trains, brakes and controls, are located inside the main screw of the displacement mechanism. The apparatus can also prevent the free downward acceleration of the mobile screw upon uncontrolled free rotation thereof simply because of the small pitch angle of the screw thread interacting with the inherent frictional forces occurring within the bearing blocs or blocks (it is noted that all words 'bloc' and 'blocs' appearing hereinafter have the intended meaning of 'block' and 'blocks', respectively). Furthermore, in order to allow the apparatus to function with a multi-ton load charge acting on a single bearing ball, extensive research work, analysis, calculations and tests (up to different destruction tests) were performed, including different aspects such as components geometry, alloy compositions, thermal treatments, and the like. Therefore, one skilled in the art would realize that it would not as simple as assembling different parts coming from different apparatuses together to get the present load displacement apparatus although some features may seem obvious after the fact, but aren't in reality.

An advantage of the present invention is that the load displacement apparatus has ball bearing blocs, mounted on a structure, that are successively engaged by a screw device and that can support the latter over only an angular (arc) segment thereof that typically varies between about ten and about sixty-five degrees, although the actual could be really small in the case only one of the bearing balls would momentarily supports the screw device by itself.

Another advantage of the present invention is that the load displacement apparatus could never end up in a free fall; if a bearing ball gets broken, the entire weight of the mobile platform would be supported directly by the support bloc that would even prevent any free fall rotation of the screw. Furthermore, with a pitch angle less than about three degrees (3°), frictional forces would prevent vertical free fall acceleration of the screw, even with lubricated bearing balls.

A further advantage of the present invention is that the load displacement unit allows certain misalignment of the screw device on its axis relative to the fixed structure, such that the bearing balls supporting the screw are allowed to be radially displaced (relative to the radial direction of the screw) within an arcuate recess of the screw and/or a width of the loop channel allowing this transverse displacement of the balls therein. The load displacement unit further allows for small variations of the distance between successive supporting bearing blocs with the screw having a slightly larger pitch for either or both end threads.

A further advantage of the present invention is that the load displacement apparatus (lifting mechanism) has a speed range from about 1 to about 300 feet per minute (about 0.3 to about 100 meters per minute).

Still another advantage of the present invention is that the load displacement apparatus can be programmable to stop at different predetermined locations along the tower.

Another advantage of the present invention is that the load displacement apparatus is easily adaptable to existing load displacement or scaffolding systems because of compactness, existing platforms and along existing towers or simple beams having support blocs attached thereto.

Still a further advantage of the present invention is that the lifting mechanism is about 85% efficient when non-lubricated and about 95% when lubricated.

According to an aspect of the present invention, there is provided a load displacement apparatus for displacing a mobile component along an elongate fixed structure, said apparatus comprises: a worm screw mountable on the mobile component for rotation about a screw axis, said worm screw defining an arc segment thereof and having at least one thread helically extending therearound about the screw axis, said thread defining a thread angle; a plurality of support blocks mountable on the fixed structure, said plurality of support blocks being spaced apart from one another along the fixed structure to be successively in meshing engagement with said worm screw for movably supporting the mobile component along the fixed structure; each of said plurality of support blocks including a plurality of bearing balls freely movably mounted thereon, said plurality of bearing balls selectively and movably engage said worm screw, said plurality of bearing balls being located within a closed-loop ball path channel formed into a respective one of said plurality of said support blocks, said closed-loop ball path channel having a contacting path portion where said plurality of bearing balls selectively and movably engaging said worm screw, said contacting path portion having a depth larger than a radius of said plurality of bearing balls, said contacting path portion being curved about the screw axis so as to span over and in register with said arc segment; and said curved contacting path portion lying in a plane oriented with a contacting angle similar to the thread angle, each of said plurality of support blocks allowing each said plurality of bearing balls, when being in meshing engagement with said worm screw, to be spaced from an adjacent one of said plurality of bearing balls; whereby said worm screw being always in meshing engagement with at least one of said plurality of support blocks.

In one embodiment, each said bearing ball successively and movably engaging said worm screw over said arc segment thereof when entering said contacting portion of said closed-loop ball channel.

Typically, a width of at least said contacting portion of said closed-loop ball channel has a width adapted to allow displacement of said bearing balls located therein in a direction generally perpendicular to a direction of displacement along said contacting portion.

Typically, a bottom wall of said closed-loop ball path channel is profiled.

Conveniently, the contacting portion of said bottom wall is raised relative to the remaining portion thereof so as to allow only said bearing balls located over said contacting portion to be successively in meshing engagement with said worm screw.

Conveniently, the contacting portion of said bottom wall is spaced from the remaining portion thereof by an upward slope section and a downward slope section located therebetween, said contacting portion with said upward and downward slope sections forming a front section of said closed-loop ball path channel.

Conveniently, at least a top portion of the bearing balls located only within said front section of said closed-loop ball path channel are exposed to selectively contact said worm screw.

In one embodiment, each said support bloc includes a lower section and an upper section, said closed-loop ball path channel being formed at least partially within said lower section, said upper section having said channel opening formed therein.

Typically, the upper section extends laterally beyond said lower section for protection of said plurality of bearing balls against weather conditions.

Conveniently, the upper section is shaped so as to follow a shaped thread of said worm screw.

In one embodiment, the apparatus further includes an actuator mechanism connecting to said worm screw for selectively actuating rotation thereof.

In one embodiment, the worm screw is a hollow screw, said actuator mechanism mounting inside said hollow screw for selective actuation thereof.

Conveniently, the worm screw has a thread with a first pitch at a first end thereof, a last pitch at a second end thereof and at least one intermediate pitch therebetween, at least one of said first and last pitches being larger than the at least one intermediate pitch.

Typically, the worm screw has a thread with a thread angle being equal or less than three (3) degrees.

In one embodiment, the worm screw includes at least one thread helically extending therearound, said thread having an arcuate recess extending inwardly into and circumferentially all along a contacting surface of said thread for alignment of said balls selectively meshing therewith.

Conveniently, the arcuate recess tapers wide at least one helical end of said thread for self alignment of said at least one bearing ball at meshing engagement thereof with said worm screw.

In one embodiment, the apparatus further includes a safety mechanism connected to said worm screw to prevent locking and unlocking of rotation thereof as long as said mobile component is either anchored to or released from the structure.

In one embodiment, the arc segment of said worm extends over a range between about ten (10) degrees and about sixty-five (65) degrees.

Conveniently, the closed-loop ball channel has ball retaining wall protrusion to prevent said bearing balls from being spaced from a bottom wall of said closed-loop ball path channel.

Typically, the ball retaining wall protrusion is a top wall of said closed-loop ball path channel in a remaining portion other than the contacting portion thereof.

According to another aspect of the present invention, there is provided a scaffolding system comprising a mobile platform, an elongate tower and a load displacement apparatus as described hereinabove connected to the platform and the tower for selective displacement of the platform along the tower, wherein the platform and the tower form the mobile component and the fixed structure respectively.

In one embodiment, the tower includes a pair of substantially parallel elongate beams, said plurality of support blocs interconnecting said beams to one another.

In one embodiment, the tower has a peripheral wall with a longitudinal slit extending therealong and defining an open cross section of said tower, said worm screw being located inside said open cross section.

Typically, the platform is located outside the tower, said platform including a link structure connecting to said worm screw, said link structure extending through said longitudinal slit.

Conveniently, the system further includes at least one work platform located outside of the tower and releasably attaching thereto, said at least one work platform being releasably anchorable to the mobile platform for displacement thereof along the tower.

Typically, the mobile platform is releasably anchorable to the tower at selective positions therealong.

Conveniently, the link structure includes a safety mechanism connected thereto to prevent locking and unlocking of rotation of said worm screw as long as said mobile platform is either anchored to or released from the tower.

In one embodiment, the plurality of support blocs are arranged in a magazine movably connected to the tower to convey said support blocs along the tower in a preceding relationship relative to the worm screw.

In one embodiment, the plurality of support blocs are arranged in groups, all said support blocs of each said group simultaneously selectively being in meshing engagement with said worm screw.

Conveniently, all said support blocs of each said group simultaneously selectively being in meshing engagement with said worm screw over a 360-degree section of a thread thereof.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 13 is a simplified enlarged broken section view of the embodiment of FIG. 12;

FIG. 13a is another embodiment of a bearing block of the present invention, having a one-piece body containing all the bearing balls therein; and FIG. 14 is an enlarged view taken along line 14 of FIG. 13a, schematically showing the width of the channel relative to the bearing ball to allow its transverse displacement therein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
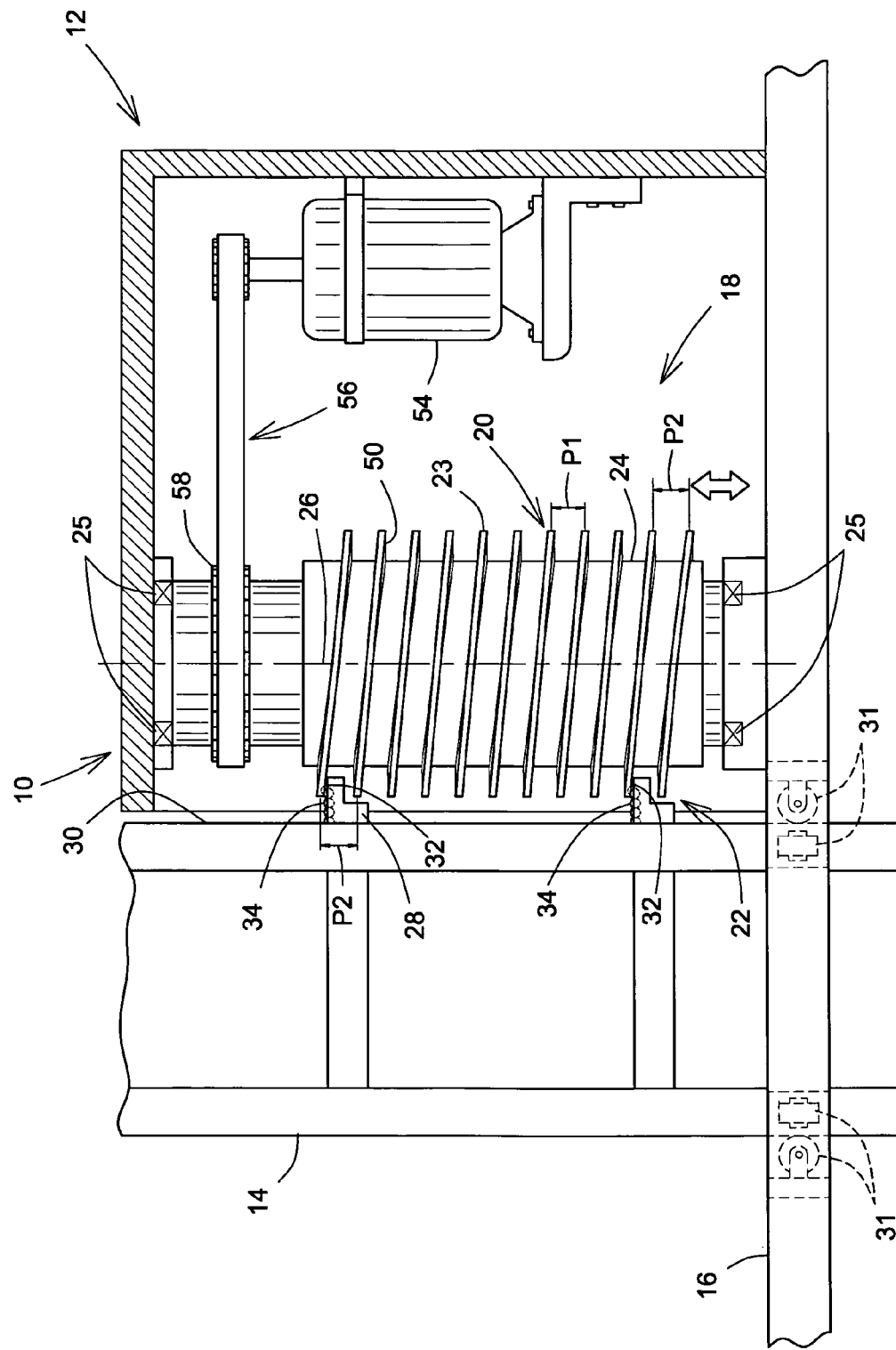
FIG. 1 is a simplified broken side view of an embodiment of a load displacement apparatus, or scaffolding lifting mechanism, in accordance with the present invention with an external actuator with reducing gearbox.

Referring to FIG. 1, there is schematically shown an embodiment of a load displacement apparatus or system 10 in accordance with the present invention. Although it is obvious to one having ordinary skill in the art that the load displacement apparatus 10 could be used in many different configurations in different technical areas, only the configuration of a lifting mechanism 18 of a scaffolding system 12 will be described in further details hereinbelow.

Figure 2:
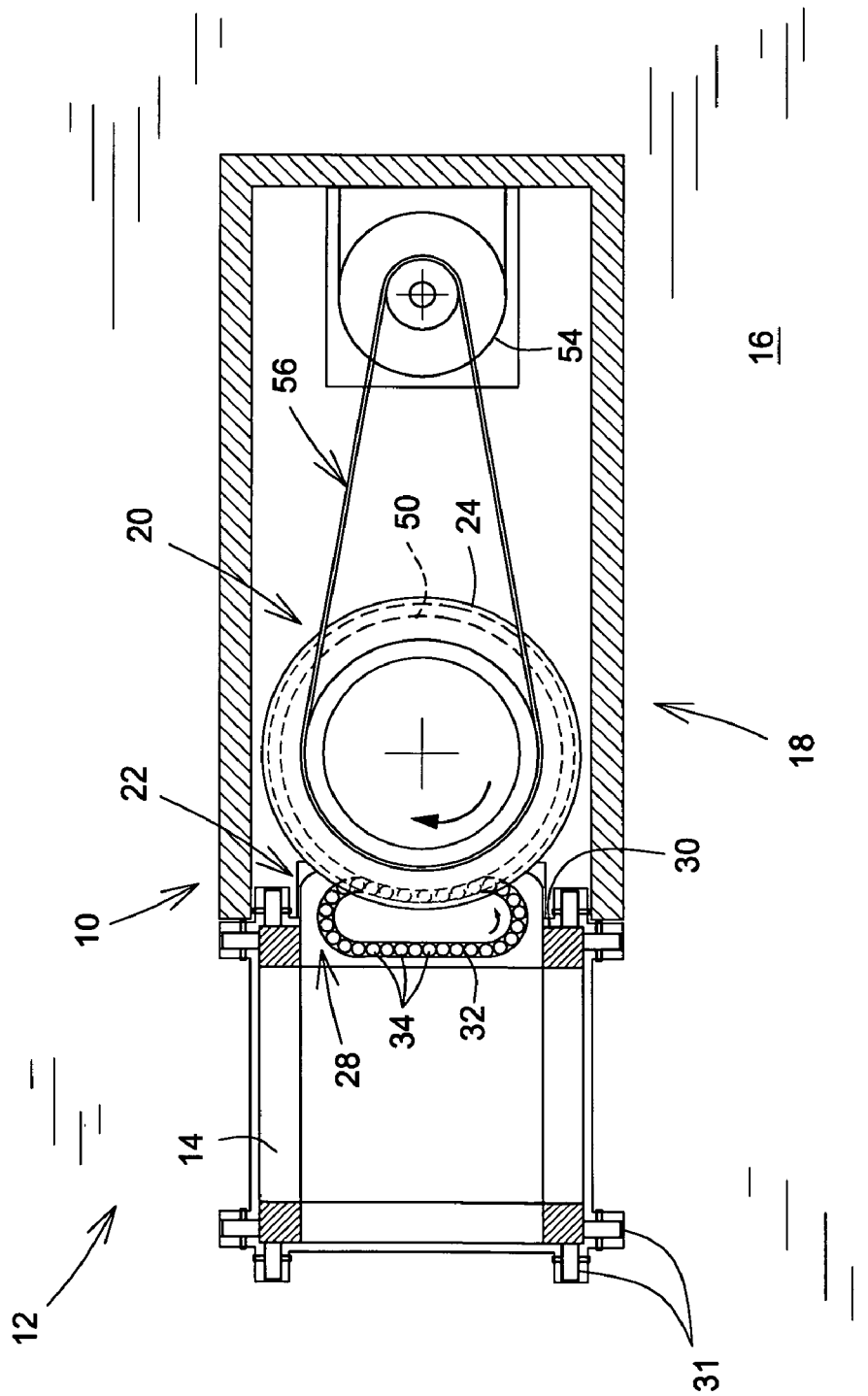
FIG. 2 is a simplified broken section plan view of the lifting mechanism of FIG. 1.

Referring more specifically to FIGS. 1 and 2, the scaffolding system 12 includes a generally vertically oriented tower 14 or post that supports a platform 16 movable there along. Typically, the tower 14 is rectangular in cross-section but could also be of any polygonal shape or circular shape without departing from the scope of the present invention. Typically, a mobile component 20 of a lifting mechanism 18 mounted on the platform 16 meshes with a corresponding fixed component 22 connected to the tower 14.

Figure 3:
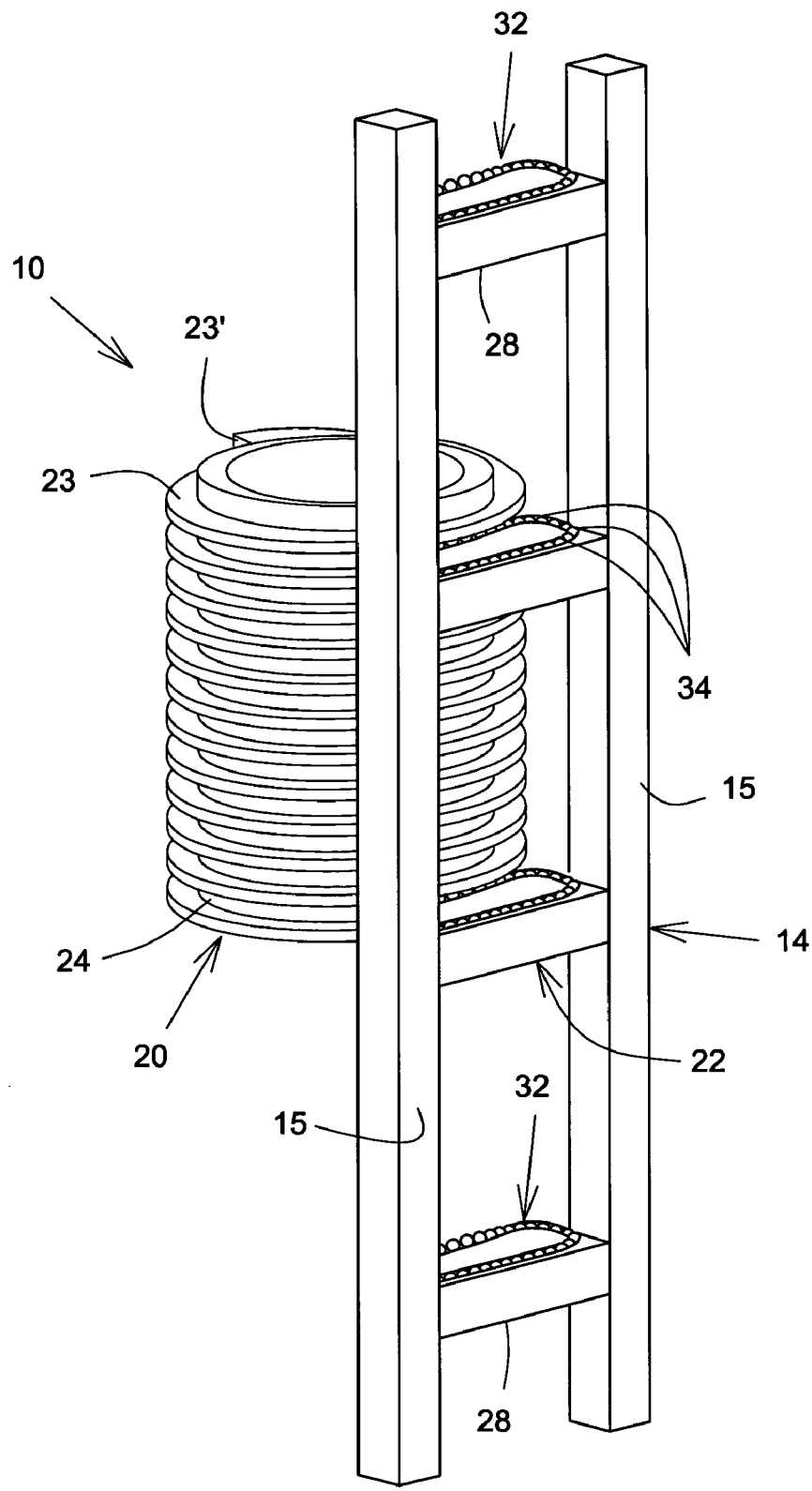
FIG. 3 is a simplified schematic broken rear perspective view a worm screw moving along support blocks with bearings of the embodiment of FIG. 1.
Figure 3A:
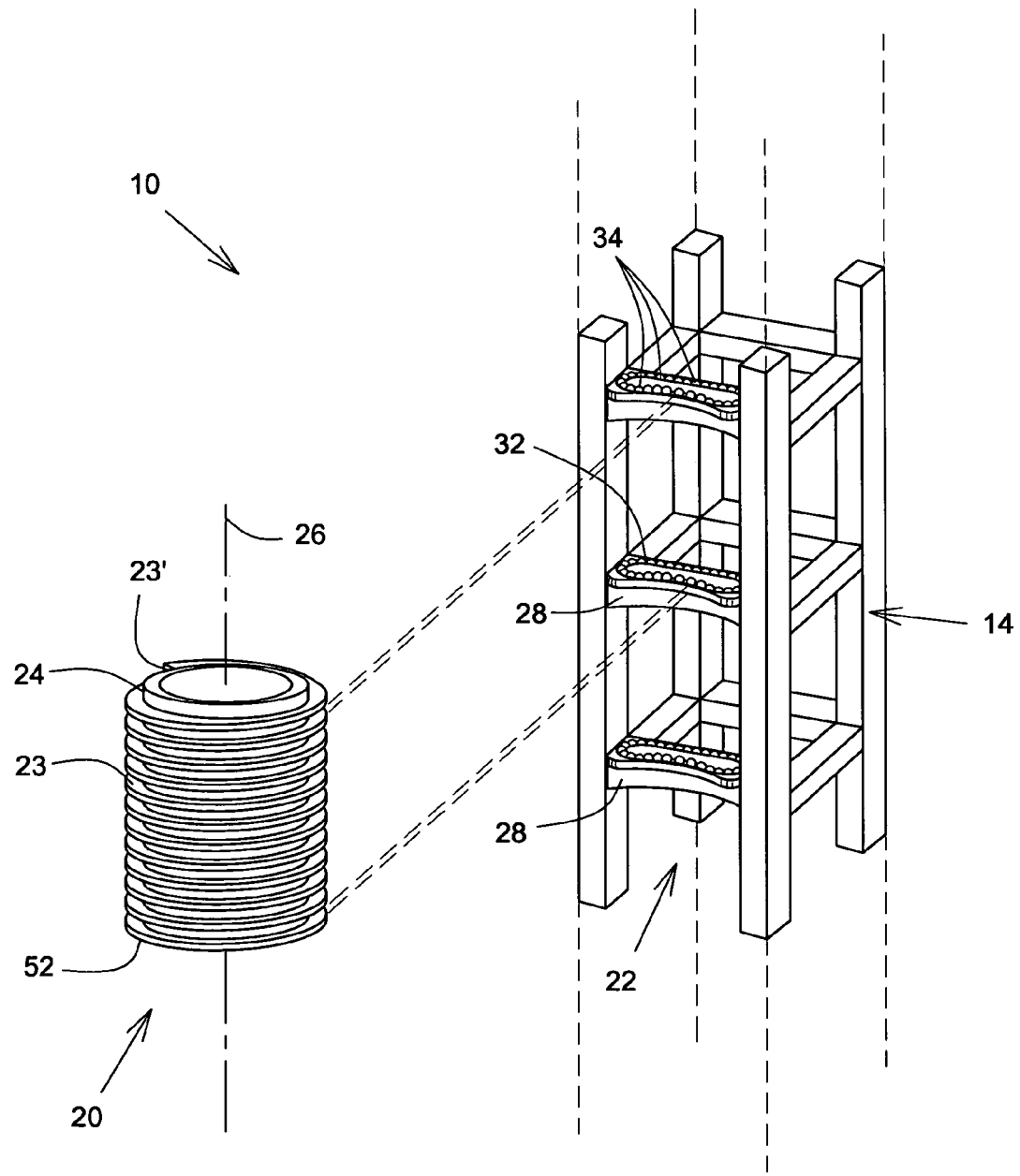
FIG. 3a is a simplified schematic broken exploded front perspective view of the embodiment of FIG. 3.
Figure 9:
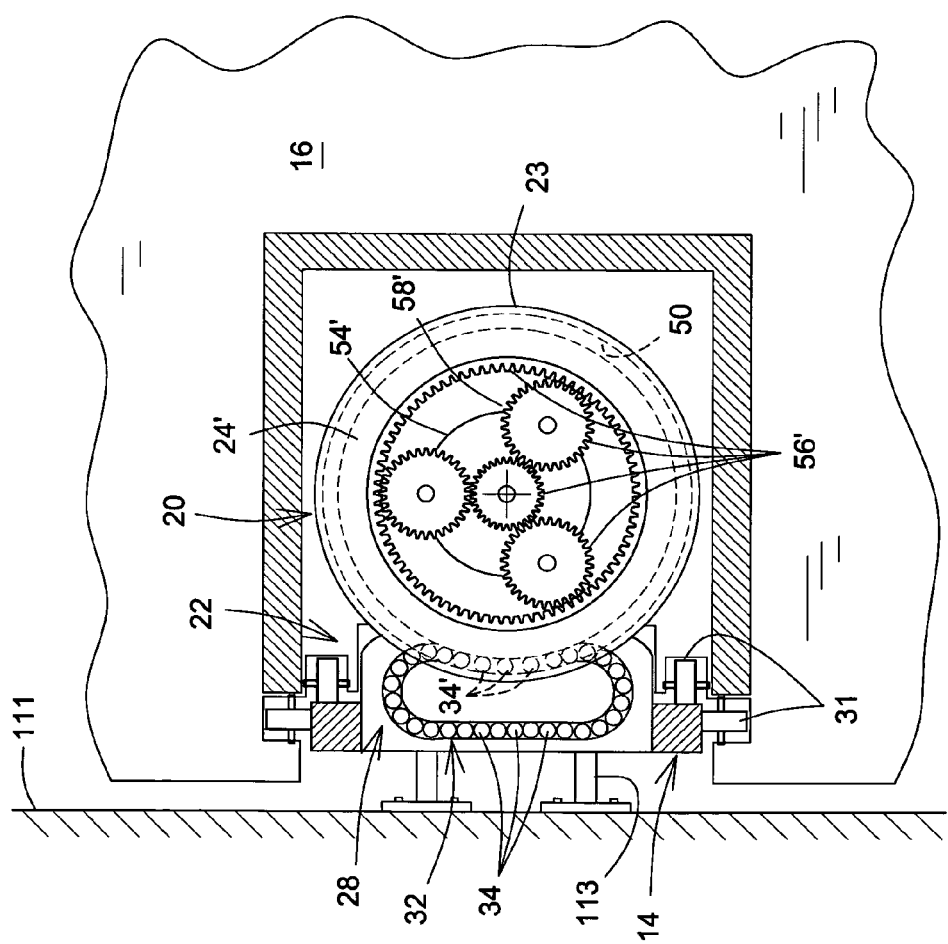
FIG. 9 is a view similar to FIG. 2, showing another embodiment of the lifting mechanism of FIG. 1 with an internal actuator and reducing planetary gearbox shown in dashed lines inside the worm screw.

As seen more specifically in FIG. 3, the mobile component 20 of the lifting mechanism 18 is typically a worm screw 24 mounted on the platform 16 via conventional roller bearings 25 or the like for free rotation about its generally vertical axis 26. The worm screw 24 is meshable with a plurality of support blocs or blocks 28 (it is noted that all words 'bloc' and 'blocs' appearing hereinafter have the intended meaning of 'block' and 'blocks', respectively) that form the fixed component 22 of the lifting mechanism 18. The support blocs 28 are typically equally spaced from one another along a side wall 30 of the tower 14 such that at least one, preferably two, support bloc 28 is fully engaged by a thread 23 of the worm screw 24 at any given longitudinal position of the platform 16 along the tower 14. The tower 14 could also include a plurality of vertical beams 15 linked together via the support blocs 28, as shown in FIGS. 3 and 9.

The platform 16 supporting the mobile component 20 of the lifting mechanism 18 is movably guided along the tower 14 using a guiding mechanism, typically side rollers 31, conventional in the art, or the like rollably connecting to the tower 14.

As shown in FIGS. 3 to 8, in order to significantly reduce the friction between the worm screw 24 and the support blocs 28, the latter includes a bearing 32, formed of at least one support or bearing ball 34 movably or rollably mounted on the support bloc 28, that extends over a contacting angular or arc segment 33 of the thread 23 of the worm screw 24 along which it is in contact therewith to support the weight of the entire platform 16 including any equipment, material or workers standing thereon during its up and down displacements along the tower 14.

Figure 7:
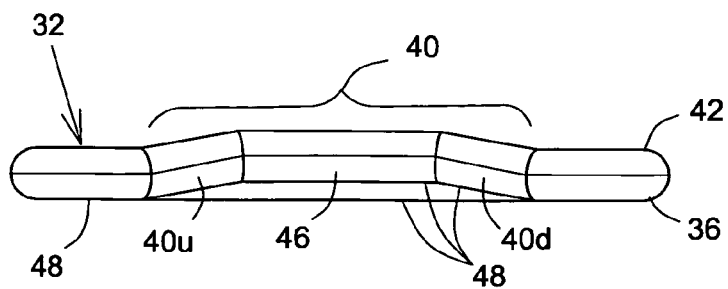
FIG. 7 is a simplified front view of the bearing path of FIG. 6.
Figure 8:
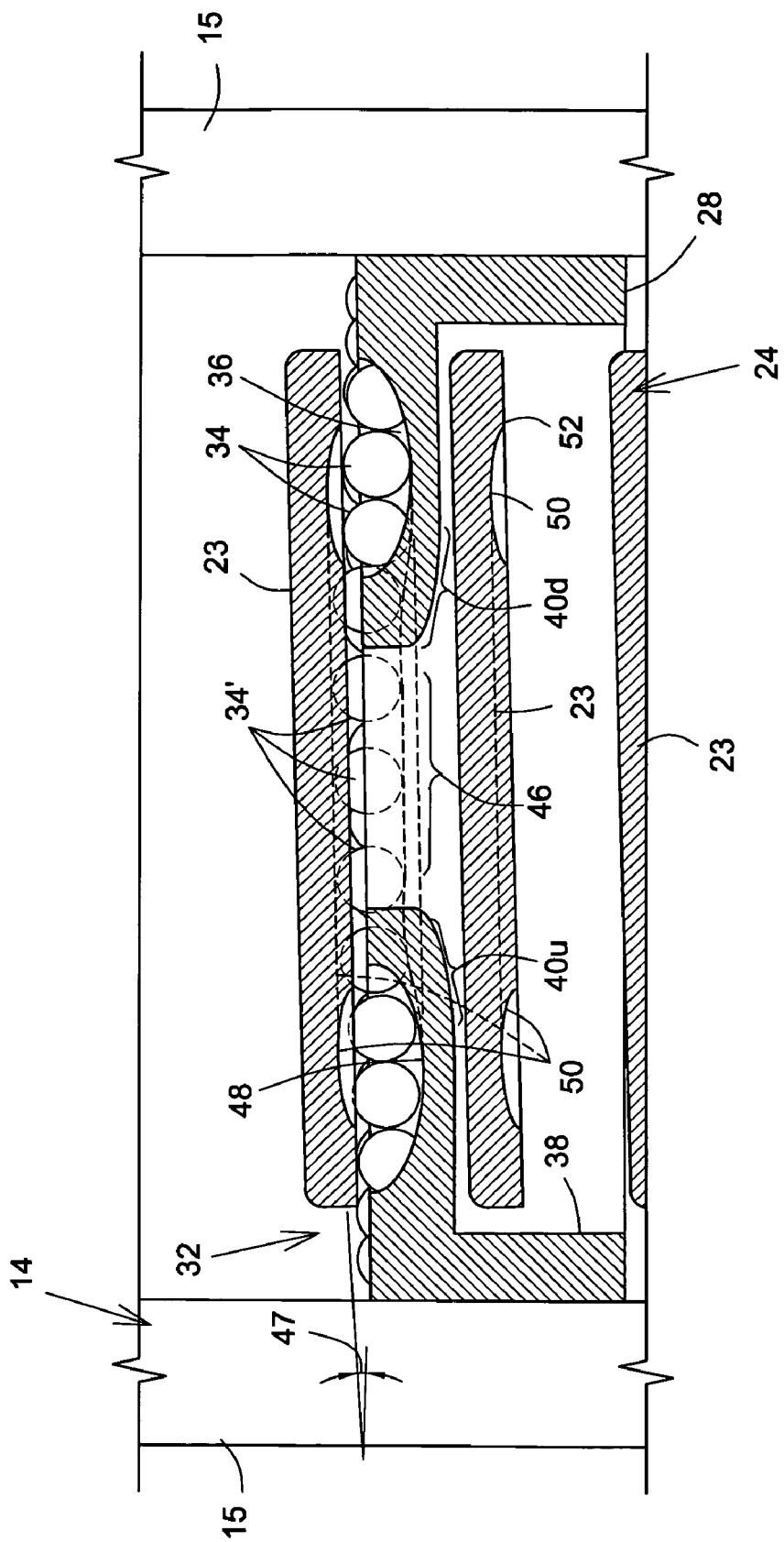
FIG. 8 is a partially broken schematic section view taken along line 8-8 of FIG. 4, showing the support block of the embodiment of FIG. 3, showing the balls of the bearing of the support block in meshing engagement with the thread of the worm screw.

As shown in FIGS. 3 to 8, the bearing 32 typically includes a plurality of support balls 34 rolling within a lower open loop channel 36 at least partially, typically entirely, formed within a lower section 38 of the support bloc 28 and defining a closed-loop ball path channel. Preferably, the balls 34 have their top portion exposed along a front section 40 of the lower loop channel 36. When outside of the front section 40, the balls 34 are typically fully covered by an upper open loop channel 42 (see FIGS. 5 and 7) formed within an upper section 44 of the support bloc 28. Typically, the lower loop front section 40 extends over at least a contacting portion 46 of the lower loop channel 36 which corresponds to the angular segment 33 in which the balls 34' contact the worm screw 24 and support the platform 16. Obviously, the balls 34' of the bearing 32 typically lie within a plane oriented with a contacting angle similar to the pitch angle 47 of the thread 23 of the worm screw 24 it meshes with as seen in FIG. 8. Although the pitch angle 47 could be selected to any value, it is preferably three degrees (3°) or less, at which angle the frictional forces inside the bearing 32 are sufficient to prevent an accelerated free rolling fall of the screw in case of inadvertent failure of all other safety mechanisms.

The closed-loop path channel followed by the balls 34 could also lie in a generally vertical plane, for substantially horizontal displacement of the worm screw in relation therewith, without departing from the scope of the present invention. In such a case, each bloc 28 would typically include a second bearing for engaging the opposite side of the thread 23 during displacement of the worm screw 24 in the reverse direction. Alternatively, a second series of blocs 28 could be used to engage the opposite side of the thread 23. Accordingly, the displacement trajectory of the mobile component 20 could also be inclined, and any trajectory could be either rectilinear or curved such that, for example, the load displacement apparatus 10 of the present invention could well be used to displace a load in a vertical trajectory that gradually changes to a horizontal one.

In order to prevent the balls 34, 34' to come out from the channel 36, as more specifically illustrated in FIGS. 13 to 14, the channel 36 typically has a depth D larger than the radius R of the balls 34, 34' (at least in the contacting portion 46 thereof) and a transverse (as seen in a crass-sectional plane of the channel) channel opening 49 smaller than a diameter 2R of the balls 34, 34'.

Figure 5:
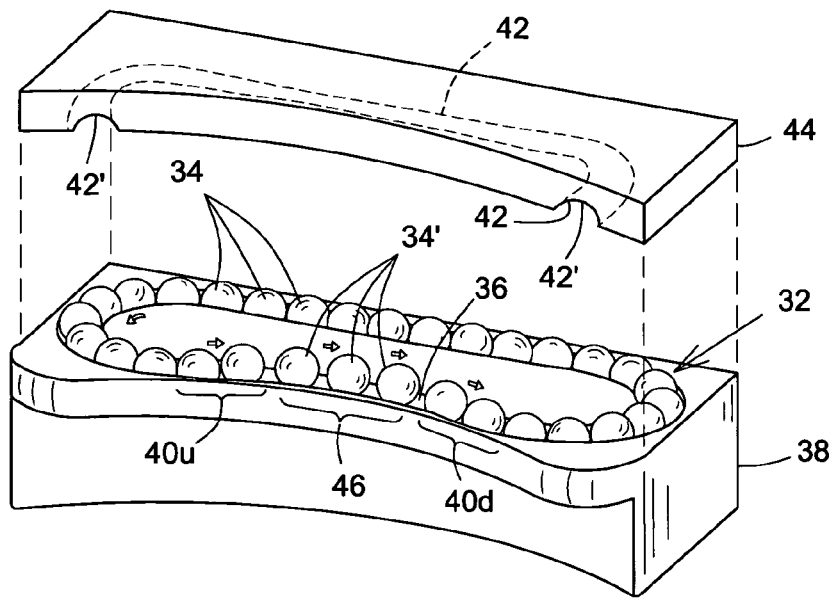
FIG. 5 is an enlarged schematic exploded front perspective view of a support block of the embodiment of FIG. 3, showing the balls of the bearing in the lower loop channel.
Figure 6:
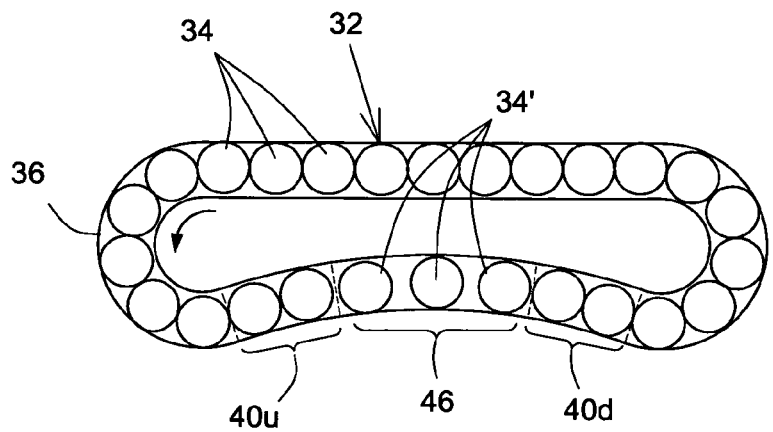
FIG. 6 is a simplified top plan view of the path followed by the balls of the support block of FIG. 5.

Accordingly, the channel opening 49 is defined by a ball retaining wall protrusions 49' (at least on one side of the channel but preferably on symmetrically on both sides thereof) that further prevent the balls 34, 34' from being spaced from the bottom wall 48 of the channel 36. The ball retaining wall protrusions 49' contribute to prevent any zigzag phenomenon that would cause wear and ultimately jamming of the bearing 32. As shown in FIG. 5, the ball retaining wall protrusions 49' are provided at the remaining portion of the channel 36 (other than the front section 40) by the top wall 42' of the upper open loop channel 42 formed within the upper section 44.

As detailed in FIGS. 7 and 8, the bottom wall 48 of the lower loop channel 36 is typically profiled at least over a portion of the front section 40, that includes the contacting portion 46 (see FIGS. 4 and 6) in which the balls 34' contact the worm screw 24, to ensure that each ball 34 successively gets into contact with the worm screw 24, one at a time after being pushed by the following balls 34 ramping up the upward slope 40*u*, without contacting adjacent balls 34 once in contact with the screw 24 (due to a pulling effect caused by the contact therewith). Accordingly, just before contacting the thread 23 of the worm screw 24, a ball 34 engages an upward slope 40*u* of the bottom wall 48 along the angular segment 33 at a location adjacent the beginning of the contacting portion 46 to be slightly raised and displaced away from the following ball 34. The bottom wall 48 has a following downward slope 40*d* along the angular segment 33 at a location adjacent the end of the contacting portion 46 to allow the balls 34' to disengage from the thread 23 of the worm screw 24 and smoothly follow a return portion of the lower loop channel 36 by pushing on the preceding balls 34. Accordingly the balls 34 are typically spaced enough from the contacting surface of the thread 23 to be able to travel generally radially relative therefrom at both ends of the front section 40 spanning over and in register with the angular segment 33. Typically, the contacting portion 46 circumferentially extends or spans over about ten and about twenty-five degrees) (10°-25°, although it could be a singular point (in the case of only one ball 34' contacting the screw thread 23) or even extend beyond 25°. Similarly, both the upward and the downward slopes 40*u*, 40*d* (or vice versa depending on the direction of displacement of the screw 23 relative to the blocs 28) typically circumferentially extend over about ten and about twenty degrees (10°-20°. These above angle values are provided as examples only and could vary without departing from the scope of the present invention.

Figure 4:
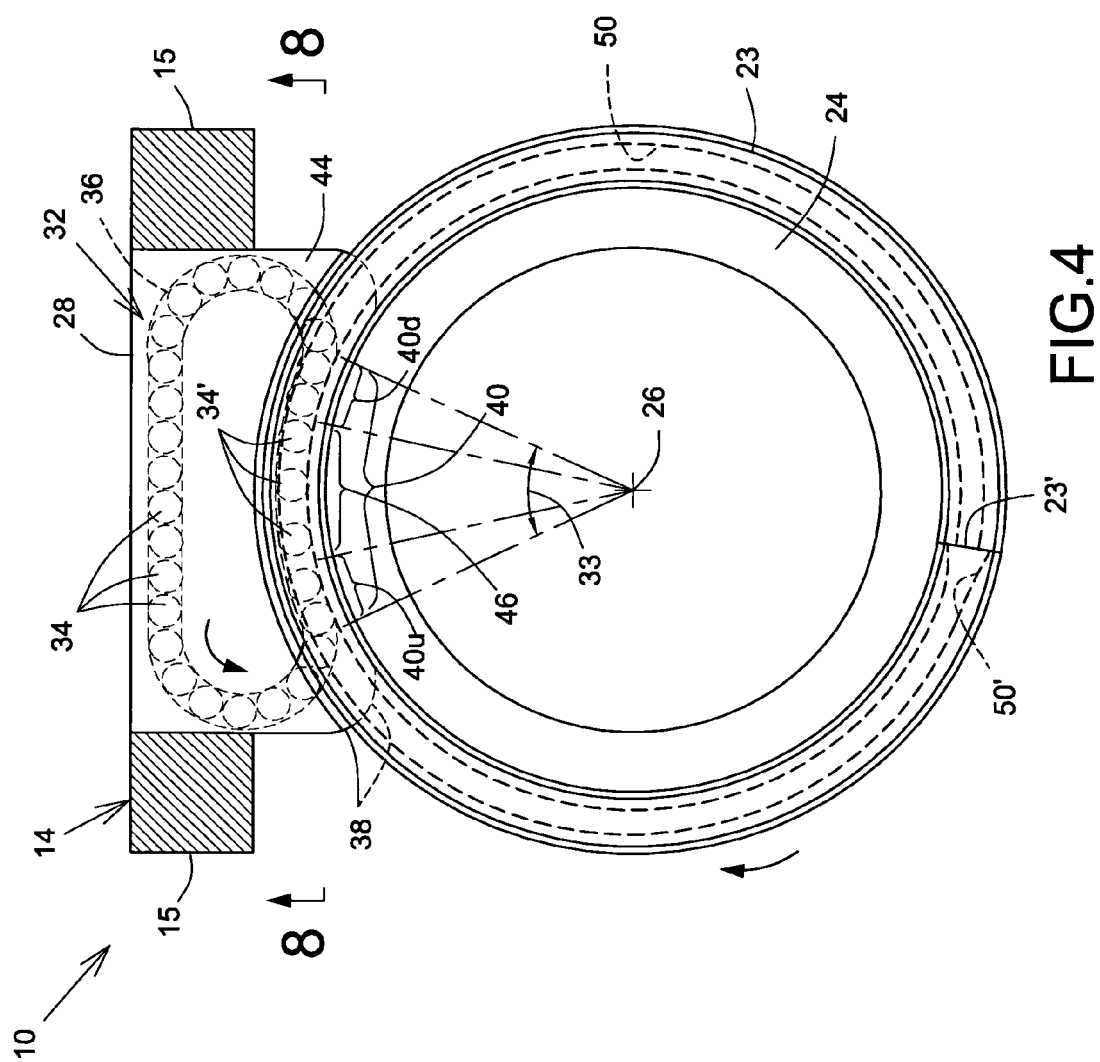
FIG. 4 is a schematic top plan view of the embodiment of FIG. 3, showing the balls of the bearing in meshing engagement with the thread of the worm screw.

As shown in FIGS. 4 and 8, the balls 34' typically engage an arcuate recess 50 extending inwardly and circumferentially all along the contacting surface 52 of the thread 23 of the worm screw 24 to ensure proper alignment of the worm screw 24 with the support blocs 28.

In case of hazard occurring at the bearing 32 level (such as the collapse or destruction thereof), the supporting bloc 28 itself would support the load of the platform 16 and prevent the latter from falling down at incontrollable speeds because of the screw thread 23 directly engaging the support blocs 28.

As shown in FIGS. 1 and 2, an actuator 54 for rotating the worm screw 24 is also mounted on the platform 16 generally adjacent the worm screw 24. Typically, the actuator 54 is connected to the worm screw 24 via a reducer gearbox 56 or the like, the latter forming an actuator mechanism with the actuator 54. As it would be obvious to one skilled in the art, the actuator 54 could be any conventional actuator such as an electric motor, a stepper motor, a generator vector motor (acting as a motor in one direction and as a generator in the other), a hydraulic motor, a pneumatic motor, an internal combustion engine, a steam engine or the like. Depending of the actuator 54 considered (such as pneumatic motor or steam engine), one can have a submersible platform if required, for underwater activities such as for port installations, boatyards, shipyards, drilling platforms, large swimming pools and the like or in toxic gaseous environment working conditions.

Obviously, when used in a scaffolding system 12, the actuator 54 could only actuate the worm screw 24 in one direction to raise the platform 16 since the gravity can be used to lower the platform 16. In such a case, the lifting mechanism 18 obviously includes a brake mechanism 58 to control the rotational speed of the worm screw 24, especially during the downward displacement thereof. The brake mechanism 58 can include a plurality of parallel braking systems using conventional drum brakes, disc brakes, a safety gear (pawl or grige gear) or the like or even frictionless resistive magnetic brakes that could eventually recuperate the braking energy to recharge a battery, or magnets with non-nuclear low molecular magnetic fields (neodium magnets) or using the molecular resistance of high density antistock transmission oils or the like. The brake mechanism 58 could possibly be embedded within the gearbox 56 if preferred.

On the other hand, the actuator 54 could be a double action actuator or the gearbox 56 could include a switching mechanism (not shown) to reverse the rotation of the worm screw 24.

Alternatively, as shown in FIG. 9, the actuator 54', the gearbox 56' and the brake mechanism 58' could be entirely or at least partially located inside the hollow worm screw 24'. In such a case, the gearbox 56' could be a planetary-type reducer gearbox.

Furthermore, in a situation with at least two scaffolding systems 12 assembled side-by-side, the adjacent platforms 16 mounted on adjacent towers 14 could have retractable couplings (not shown) such as telescopic splines connectable to one another to enable an operator to either control all platforms 16 with only the lifting mechanism 18 of one of the towers 14 or to synchronize the actuation of all lifting mechanisms 18 of all the towers 14.

Figure 10:
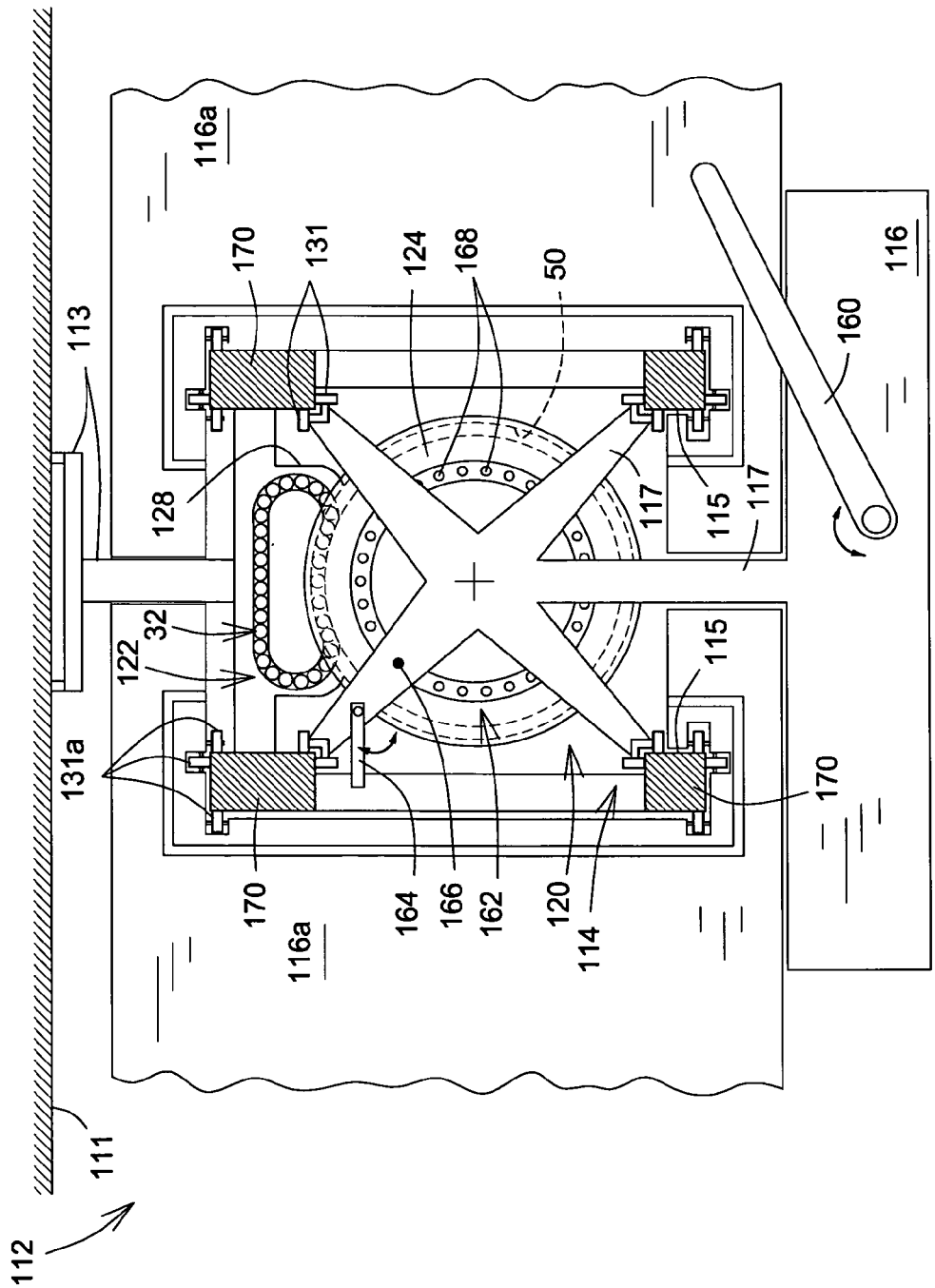
FIG. 10 is a simplified broken top plan view of an embodiment of a scaffolding system in accordance with the present invention, showing an embodiment of a lifting mechanism in accordance with the present invention located inside an open tower and connected to a service platform independent of work platforms.

As described hereinabove, the mobile component 20 of the lifting mechanism 18 is typically mounted on the platform 16. Now referring more specifically to FIGS. 10 and 11, the mobile component 120 of the lifting mechanism 118 is alternatively connected to or mounted on a service platform 116. Furthermore, instead of being located outside of the tower 114, the lifting mechanism 118 is substantially located inside the limits of the generally open cross section of the tower 114 such that the peripheral wall of the open tower 114 includes at least one longitudinal slit 115 extending there along, shown in the front thereof. Such an open tower 114 could also have an H-shaped cross section (not shown) without departing from the scope of the present invention. The fixed component 122 of the lifting mechanism 118 is typically connected to an internal surface of the tower 114. A link structure 117 extending through the tower slit 115 connects the lifting mechanism 118 to the service platform 116 located outside the tower 114. When relatively long towers 114 are used, a plurality of tower anchors 113 secure the tower 114 to an adjacent building structure 111 at generally regularly spaced intervals. Typically, the tower anchors 113 connect to the tower 114 on a side generally opposite to the longitudinal slit 115.

Figure 11:
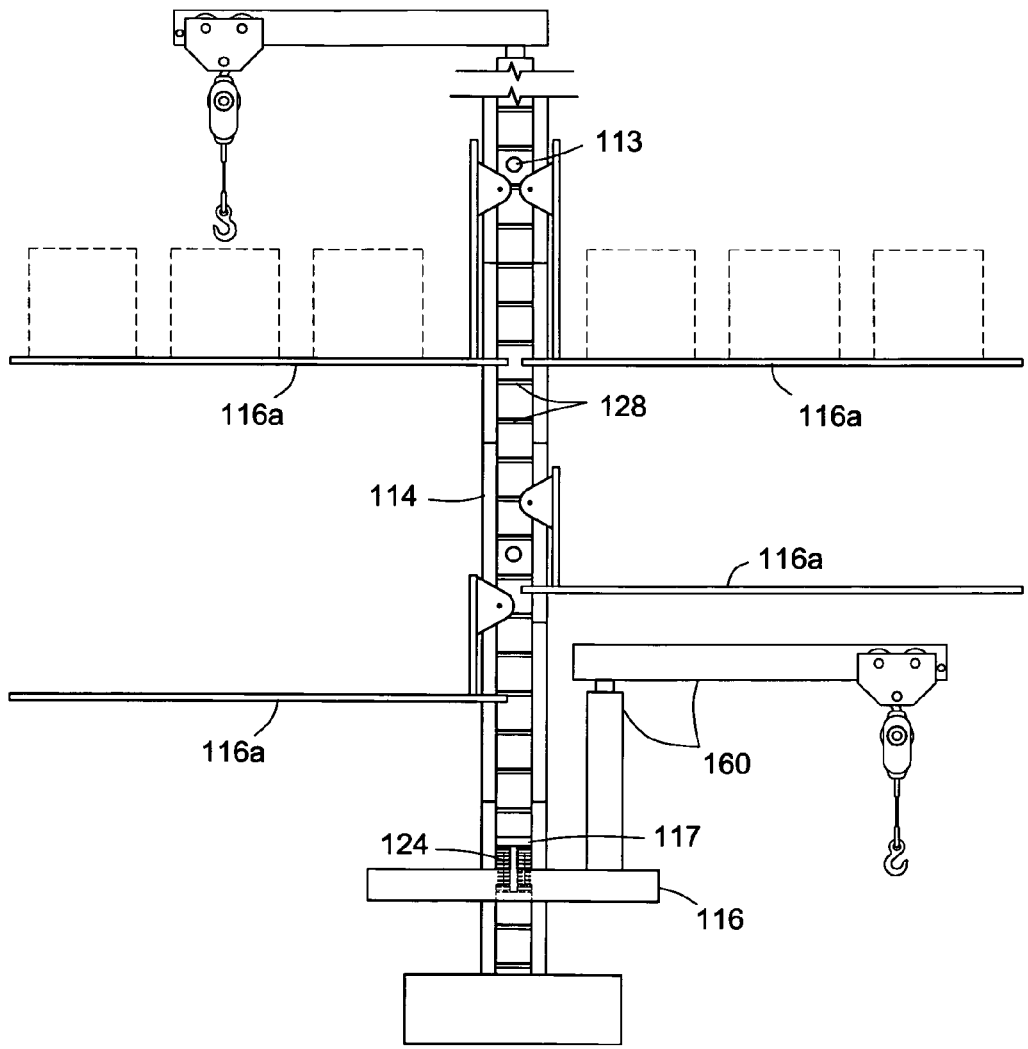
FIG. 11 is a simplified broken front view of the embodiment of FIG. 10.

In such a scaffolding system 112, the work platforms 116a releasably attached to the tower 114 at same levels or not are typically located on either side of the tower 114 adjacent the building structure 111 to balance the overall load supported on both sides of the tower 114, as shown in FIG. 11. The service platform 116 is used first to successively displace the different work platforms 116a releasably anchored thereto up to their respective desired location along the tower 114 and release them when the work platform 116a are properly secured to the tower 114, and second to carry material and workers from/to the ground to/from the different work platforms 116a or between work platforms 116a. For example, the service platform 116 could also carry a manual or remotely operable lifting or handling arm 160 mounted thereon to lift and displace the material between the service platform 116 and the different work platforms 116a. The handling arm 160 can also serve to handle tower longitudinal sections for self-erection of the tower 114.

Typically, the service platform 116 needs to be anchored to the tower 114 to enable the anchoring of the work platform to the tower 114. A safety mechanism 162 prevents the operator from blocking and unblocking the rotation of the worm screw 124 unless the service platform 116 is either anchored to the tower 114, at any selective position there along, with platform anchors 164 being in full engagement configuration or released therefrom with the platform anchors 164 being in full released configuration.

The safety mechanism 162 includes a retractable shear pin 166 mounted on the link structure 117 and releasably engageable into one of a plurality of bore holes 168 integral with the worm screw 124 and circumferentially spaced from one another about the axis 126 thereof.

The link structure 117 supporting the mobile component 120 of the lifting mechanism 118 is movably guided along the tower 114 using a guiding mechanism, typically side rollers 131, conventional in the art, or the like rollably connecting to the tower 114.

Although shown with similar side rollers 131a, the work platforms 116a don't really need these side rollers 131a since they are selectively carried by the service platform 116 when displaced along the tower 114 while not being supported thereby or anchored thereto.

When no side rollers 131a are used to guide the work platforms 116a along the tower 114, the shape of the work platforms 116a around the tower 114 typically at least partially follows or embraces the cross-sectional projections of the tower 114 such as corner posts 170 or the like to prevent the work platforms 116a from separating from the tower 114 and falling down in case of inadvertent disengagement of the anchor connecting the two together. In such an undesirable situation, the work platform 116a would slightly tilt relative to the tower 114 and remain hooked thereto until emergency actions are taken.

To increase the load capability of the support blocks 28 could include at least one additional bearing 32 (not shown) that would lie in a substantially parallel path relative to the other over a substantially similar angular segment 33. Accordingly, one of the lower loop channels 36 would fully enclose the other one.

Alternatively, the bearing 32 could includes only one ball 34 rotatably mounted on a shaft (or two coaxial shafts) generally perpendicular to the thread 23 of the worm screw 24. Furthermore, the ball 34 could be a roller rotatably mounted on a shaft extending there through with an arcuate contacting surface to prevent wear thereof during rolling engagement with the thread 23 of the worm screw 24.

Figure 12:
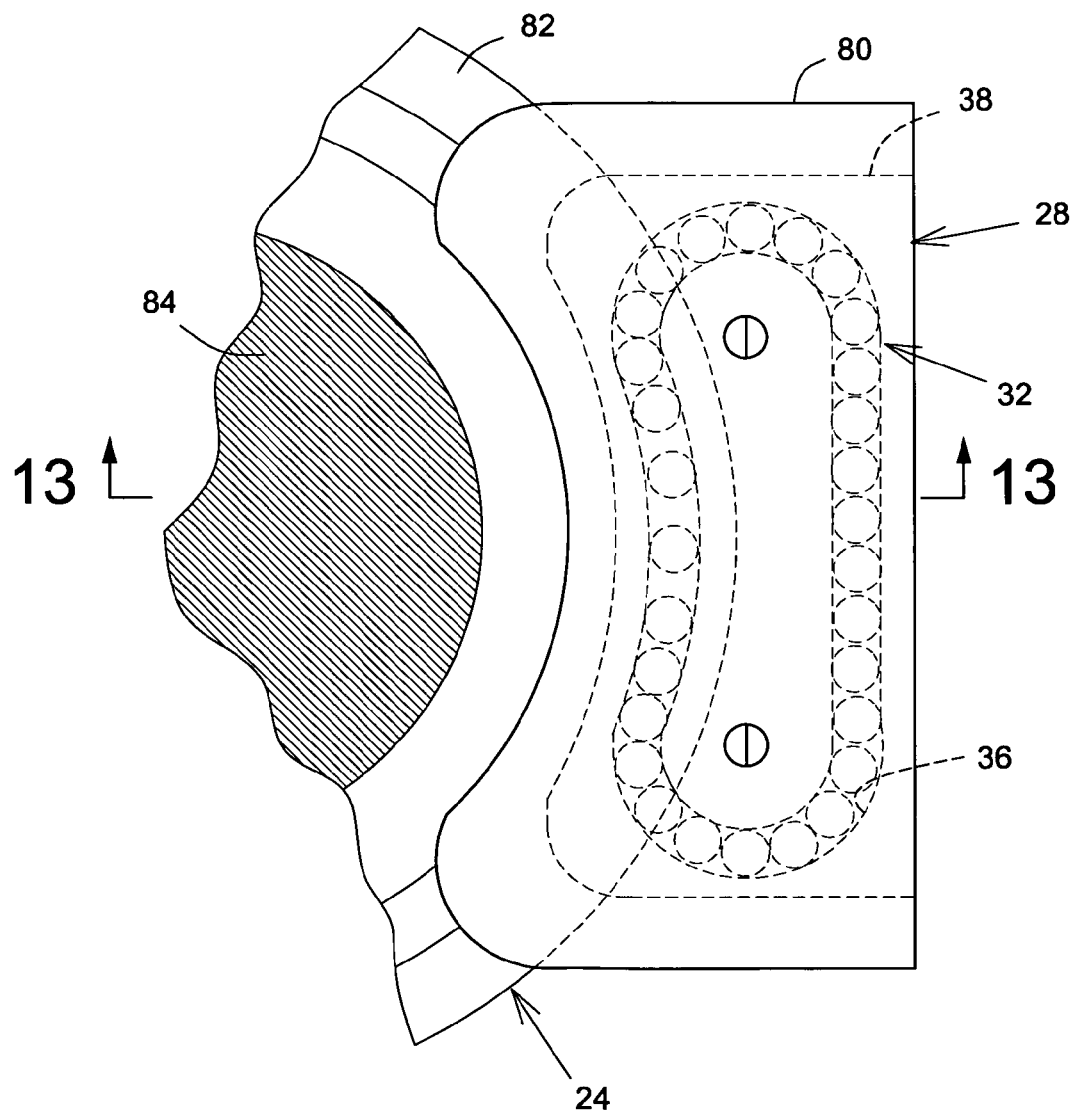
FIG. 12 is a simplified broken top plan view of another embodiment of a support block with a cover.

As illustrated in FIGS. 12 and 13, each support bloc 28 could include a bearing cover 80, or extended upper section, to protect the bearing 32 or balls 34 from the different weather conditions. The bearing cover is either permanent and spaced from the balls 34 to allow the thread 23 of the worm screw 24 to pass there between when in meshing engagement with the balls 34, or movable (not shown) between a bearing covering position when the support bloc 28 is not in meshing engagement with the worm screw 24 and an open configuration away from the bearing when the support bloc 28 is in meshing engagement with the worm screw 24. The cover 80 is typically shaped to get around or partially follow a shaped thread 82 that protrudes radially, outwardly and upwardly from the worm screw body 84. Such a cover 80 generally extends laterally (circumferentially and radially) beyond the support bloc 28 to fully protect the bearing 32 therein.

For heavy duty lifting mechanism 18, the support blocs 28 could be arranged in groups (not shown) of preferably three blocs 28 typically simultaneously engaging a same 360-degree section thread 23 of the worm screw 24. Each bloc group would typically cover an overall segment large enough (such as about 240 degrees with the three blocs 28 spaced about 120 degrees from each other) not only to ensure the engagement of the worm screw 24 with the group of support blocs 28 but also to further ensure longitudinal guiding of platform 16 relative to the tower 14 and forming the guiding mechanism instead of the side rollers 31. The bloc groups are obviously spaced from one another, typically equally, such that at least one group is in good engagement with a same 360-degree section thread 23 of the worm screw 24 at any location along the tower 14.

Although not illustrated in the Figures, a plurality of support blocs 28 could also be arranged in a loop tray or magazine of support blocs 28 movably connected to the tower 14 that would be conveyed along the tower 14 in parallel to the worm screw 24 by always preceding the latter (in either up and down directions). The support blocs 28 would slidably engage and disengage successive bloc receptacles spaced apart from one another along the tower 14. The fine alignment of the support blocs 28 with the thread 23 of the worm screw 24 could be ensure by the balls 34' engaging the arcuate recess 50 extending inwardly and all along the contacting surface 52 of the thread 23, or the like alignment mechanism. Such an arcuate recess 50 allows the balls 34' to have a slight radial misalignment relative to the screw thread 23 and allow the proper realignment thereof. As highlighted in FIG. 14, the width W of at least the contacting portion 46, and preferably the front section 40, of the channel 36 is slightly larger than the diameter 2R of the balls 34' to allow transverse displacement of the balls 34' located therein in a direction (represented by the ball 34' shown in the two extreme positions in solid and dashed lines) generally perpendicular to a direction of displacement along the channel 36. It is noted that the small transverse displacement is small enough to prevent the above-mentioned zig-zag phenomenon that could lead to wearing and/or jamming of the bearing 32.

In order to be stronger in reducing some weak points of the apparatus 10 that could cause breaking of the support bloc 28, the latter is preferably made out of a single piece, as schematically exemplified in FIG. 13a in which all the balls 34, 34' are kept captive into the entire loop channel 36. The ball access to the channel is a rear bore hole 60 with a threaded counter bore 62 closed by a corresponding screw plug 64 or the like which could locally act as the channel bottom wall 48'.

As partially shown by numeral reference 50' in FIG. 4, both helical ends 23' of the thread 23 of the worm screw 24 taper wide, radially, circumferentially and/or axially, to ensure a smooth and gradual meshing engagement of the bearings 32 of the different support blocs 28 that may not be perfectly aligned. In doing so, the balls 34' will self align because of the arcuate widen recess 50' of the contacting surface 52 of the worm screw 24. To account for small variations of the distance between successive support blocs 28, the screw 24 typically has at least one, preferably both end threads with an end pitch P2 (see FIG. 1) slightly larger than the nominal intermediate pitch P1, typically by about $1/16^{th}$ of an inch over 24 inches (about 1.5 mm over 60 cm), namely about 0.14 degree as an example.

Although the present load displacement apparatus has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A load displacement apparatus for displacing a mobile component along an elongated fixed structure, said apparatus comprising:

a worm screw mountable on the mobile component for rotation about a screw axis, said worm screw defining an arc segment thereof and having at least one thread helically extending therearound about the screw axis, said thread defining a thread angle;

a plurality of support blocks mountable on the fixed structure, said plurality of support blocks being spaced apart from one another along the fixed structure to be successively in meshing engagement with said worm screw for movably supporting the mobile component along the fixed structure;

each of said plurality of support blocks including a plurality of bearing balls freely movably mounted thereon, said plurality of bearing balls selectively and movably engaging said worm screw, said plurality of bearing balls being located within a closed-loop ball path channel formed into a respective one of said plurality of said support blocks, said closed-loop ball path channel having a contacting path portion where said plurality of bearing balls selectively and movably engage said worm screw, said contacting path portion having a depth larger than a radius of said plurality of bearing balls, said contacting path portion being curved about the screw axis so as to span over and register with said arc segment; and said curved contacting path portion lying in a plane oriented with a contacting angle similar to the thread angle, each of said plurality of support blocks allowing each said plurality of bearing balls, when being in meshing engagement with said worm screw, to be spaced from an adjacent one of said plurality of bearing balls; whereby said worm screw being always in meshing engagement with at least one of said plurality of support blocks.

2. The apparatus of claim 1, wherein each of said plurality of bearing balls successively and movably engaging said worm screw over said arc segment thereof when entering said contacting path portion of said closed-loop ball path channel.

3. The apparatus of claim 1, wherein a width of at least said contacting path portion of said closed-loop ball channel has a width adapted to allow displacement of said plurality of bearing balls located therein in a direction generally perpendicular to a direction of displacement along said contacting path portion.

4. The apparatus of claim 3, wherein a bottom wall of said closed-loop ball path channel is profiled.

5. The apparatus of claim 4, wherein said bottom wall of said contacting path portion is raised relative to said bottom wall of a remaining portion of said closed-loop ball path channel so as to allow only said plurality of bearing balls located over said contacting path portion to be successively in meshing engagement with said worm screw.

6. The apparatus of claim 5, wherein said bottom wall of said contacting path portion is spaced from said bottom wall of the remaining portion of said closed-loop ball path channel by an upward slope section and a downward slope section located therebetween, said contacting path portion with said upward and downward slope sections forming a front section of said closed-loop ball path channel.

7. The apparatus of claim 6, wherein a top portion of the plurality of bearing balls located only within said front section of said closed-loop ball path channel are exposed to selectively contact said worm screw.

8. The apparatus of claim 1, wherein each of said plurality of support blocks includes a lower section and an upper section, said closed-loop ball path channel being formed at least partially within said lower section, said upper section having a channel opening formed therein at said contacting path portion.

9. The apparatus of claim 8, wherein said upper section extends laterally beyond said lower section for protection of said plurality of bearing balls against weather conditions.

10. The apparatus of claim 9, wherein said upper section is shaped so as to follow a shaped thread of said worm screw.

11. The apparatus of claim 1, further including an actuator mechanism connecting to said worm screw for selectively actuating rotation thereof.

12. The apparatus of claim 11, wherein said worm screw is a hollow screw, said actuator mechanism mounting inside said hollow screw for selective actuation thereof.

13. The apparatus of claim 1, wherein said thread has a first pitch at a first end thereof, a last pitch at a second end thereof and at least one intermediate pitch therebetween, at least one of said first and last pitches being larger than the at least one intermediate pitch.

14. The apparatus of claim 1, wherein said thread angle is larger than zero degree(0°) and equal or less than three degrees (3°).

15. The apparatus of claim 1, wherein said thread has an arcuate recess extending inwardly into and circumferentially all along a contacting surface of said thread for alignment of said plurality of bearing balls selectively meshing therewith.

16. The apparatus of claim 15, wherein said arcuate recess comprises an arcuate widened recess at at least one helical end of said thread for self alignment of said at least one of said plurality of bearing balls at meshing engagement thereof with said worm screw.

17. The apparatus of claim 1, further including a safety mechanism connected to said worm screw to prevent locking and unlocking of rotation thereof as long as said mobile component is either anchored to or released from the fixed structure.

18. The apparatus of claim 1, wherein said arc segment of said worm extends over a range between about ten (10) degrees and about sixty-five (65) degrees.

19. The apparatus of claim 1, wherein said closed-loop ball channel has a ball retaining wall protrusion to prevent said plurality of bearing balls from being spaced from a bottom wall of said closed-loop ball path channel.

20. The apparatus of claim 19, wherein said ball retaining wall protrusion is a top wall of said closed-loop ball path channel in a remaining path portion other than the contacting path portion thereof.

21. The apparatus of claim 1, wherein a cross section of said closed-loop ball path channel in said contacting path portion has a channel opening smaller than a diameter of said plurality of bearing balls so as to retain said plurality of bearing balls therein.

22. A scaffolding system comprising:
a mobile platform movable along a fixed elongated tower; and
a load displacement apparatus connected to the platform and the tower for selective displacement of the platform along the tower, said load displacement apparatus including:
  a worm screw mountable on the mobile platform for rotation about a screw axis, said worm screw defining an arc segment thereof and having at least one thread helically extending therearound about the screw axis, said thread defining a thread angle;
  a plurality of support blocks mountable on the tower, said plurality of support blocks being spaced apart from one another along the tower to be successively in meshing engagement with said worm screw for movably supporting the mobile platform along the tower, each of said plurality of support blocks including a plurality of bearing balls freely movably mounted thereon, said plurality of bearing balls selectively and movably engaging said worm screw, said plurality of bearing balls being located within a closed-loop ball path channel formed into a respective one of said plurality of said support blocks, said closed-loop ball path channel having a contacting path portion where said plurality of bearing balls selectively and movably engage said worm screw, said contacting path portion having a depth larger than a radius of said plurality of bearing balls, said contacting path portion being curved about the screw axis so as to span over and register with said arc segment; and
  said curved contacting path portion lying in a plane oriented with a contacting angle similar to the thread angle, each of said plurality of support blocks allowing each of said plurality of bearing balls, when being in meshing engagement with said worm screw, to be spaced from an adjacent one of said plurality of bearing balls; whereby said worm screw being always in meshing engagement with at least one of said plurality of support blocks.

23. The system of claim 22, wherein said tower includes a pair of substantially parallel elongated beams, said plurality of support blocks interconnecting said beams to one another.

24. The system of claim 22, wherein said tower has a peripheral wall with a longitudinal slit extending therealong and defining an open cross section of said tower, said worm screw being located inside said open cross section.

25. The system of claim 24, wherein the mobile platform is located outside the tower, said mobile platform including a link structure connecting to said worm screw, said link structure extending through said longitudinal slit.

26. The system of claim 25, further including at least one work platform located outside of the tower and releasably attaching thereto, said at least one work platform being releasably anchorable to the mobile platform for displacement thereof along the tower.

27. The system of claim 25, wherein the mobile platform is releasably anchorable to the tower at selective positions therealong.

* * * * *